United States Patent [19]

Kanamori et al.

[11] 4,400,417
[45] Aug. 23, 1983

[54] MOUNTING OF TILTABLE ORNAMENTS ON MOTOR VEHICLES

[75] Inventors: Hiroshi Kanamori; Takeshi Kanazawa, both of Yokohama, Japan

[73] Assignee: Nissan Motor Co., Ltd., Yokohama, Japan

[21] Appl. No.: 370,043

[22] Filed: Apr. 20, 1982

[30] Foreign Application Priority Data

May 6, 1981 [JP] Japan .................................. 56-67872

[51] Int. Cl.³ .............................................. B60R 13/04
[52] U.S. Cl. ................................... 428/31; D12/197; 40/591; 280/727; 411/429
[58] Field of Search ........................... 428/31; 40/591; 280/727; 411/429; D12/197

[56] References Cited

U.S. PATENT DOCUMENTS

| 3,813,113 | 5/1974 | Burnham | 428/31 X |
| 3,968,977 | 7/1976 | Wilfert | 428/31 X |
| 4,349,591 | 9/1982 | Kanamori | 428/31 |

FOREIGN PATENT DOCUMENTS

| 831615 | 3/1960 | United Kingdom | 428/31 |
| 1133297 | 11/1968 | United Kingdom | 428/31 |

*Primary Examiner*—Henry F. Epstein

[57] ABSTRACT

An aluminum die-cast base of the type having a sleeve-like extension is provided with anchor posts on which clips are fitted. The clips are adapted to resiliently deform for insertion into the attaching holes in a panel and then expand to grip the panel for thereby securing the base to the panel.

8 Claims, 3 Drawing Figures

MOUNTING OF TILTABLE ORNAMENTS ON MOTOR VEHICLES

BACKGROUND OF THE INVENTION

1. Field of the Invention

The present invention relates to the mounting of tiltable ornaments or emblems on motor vehicles.

2. Description of the Prior Art

A known tiltable ornament is mounted on the front of a motor vehicle and adapted to be tilted in the event of an impact so that injury to a part of a person or object striking the ornament is prevented.

A typical example of such tiltable ornament and its mounting is shown in FIG. 1 and will be described hereinbelow.

In the drawing, a hood of a passenger car is generally indicated at 10 and formed from an outer hood panel 10a and an inner hood panel 10b. On the inner hood panel 10b a striker 12 is mounted which constitutes part of a hood locking mechanism. A tiltable ornament assembly is generally indicated at 14 and comprises an ornament 16 and a base 18. The base 18 is provided with a sleeve-like downward extension 18a receiving therein a coil spring 20. The upper end of the coil spring 20 is seated on an inner shoulder of the extension 18a, whilst the lower end projects downwardly from the extension 18a and is seated on the bent or hooked lower end of a split pin 22. The split pin 22 extends upwardly from the hooked lower end thereof through the coil spring 20 and is anchored at the upper end thereof to the pedestal portion 16a of the ornament 16 whose sole is received in the correspondingly shaped seating of the base 18. In this manner, the spring 20 is arranged in a compressed state. By the foregoing, the ornament 16 is rockably and displaceably mounted on the base 18.

The base 18 thus assembled with the ornament 16 is mounted on the hood 10 with the following structure. This is, the upper hood panel 10a is formed with a flanged opening 10c. The base 18 is placed on the outer hood panel 10a by interposing therebetween a resilient base pad 24, with the downward extension 18a of the base 18 being inserted into the opening 10c. The extension 18a of the base 18 is threaded to receive a nut 26, and interposed between the nut 26 and the inner face of the outer hood panel 10a is a spacer 28 surrounding part of the extension 18a. The spacer 28 is pushed against the inner face of the outer panel 10a when the nut 26 is tightened with a suitable tool such as a socket wrench 30. By tightening the nut 26 properly, the base 12 is rigidly secured to the hood 10.

The above described ornament assembly has the disadvantage that it requires a difficult assembling work since the installation of the base 18 requires a mechanic to work from the outside of the hood 10 for placing and holding the base 18 on the hood 10 simultaneously with to work from the inside of the hood 10 for fastening the base 18 with the nut 26 and the spacer 28. The ornament assembly is further disadvantageous since it requires in the inner hood panel 10b a hole allowing a mechanic to reach to the inside of the outer hood panel 10a, causing various restrictions in design of ornament and hood. For example, the undesirable inclination of the extension 18a of the base 18 and the complicated shape of the spacer 28 in the illustrated structure were resulted from such restrictions.

SUMMARY OF THE INVENTION

In accordance with the present invention, there is provided a novel and improved tiltable ornament assembly which comprises a base adapted to be supported on a panel of a vehicle body and an ornament adapted to be supported on the base. The base is of the type having a sleeve-like extension receiving therein resilient means for yieldingly retaining the ornament in position on the base.

The base also has two anchor posts protruding inwardly of the vehicle body through openings in the panel, and attached to the anchor posts are clips which are adapted to resiliently deform for insertion into the openings and then expand to grip the panel at a location around the opening for thereby securing the base to the panel.

With the above structure, the base can be attached to the panel without requiring a mechanic to reach into the inside of the panel. That is, the ornament assembly of this invention can be installed by a mechanic working entirely from the outside of the vehicle.

It is accordingly an object of the present invention to provide a novel and improved tiltable ornament assembly for mounting on a vehicle body which, upon its installation, does not require a mechanic to reach into the inside of the vehicle, that is, which can be installed by the work entirely done from the outside of the vehicle.

It is further object of the present invention to provide a novel and improved tiltable ornament assembly of the above described character which not only makes simpler and easier the assembling work but also reduces the number of the constituents parts for thereby attaining reduced manufacturing and assembling costs.

It is a still further object of the present invention to provide a novel and improved tiltable ornament assembly of the above described character which does not cause damage and rusting of the vehicle body member on which it is mounted.

It is a yet further object of the present invention to provide a novel and improved tiltable ornament assembly of the above described character which effects flexible design of a hood on which it is mounted as well as of itself.

BRIEF DESCRIPTION OF THE DRAWINGS

The features and advantages of the tiltable ornament assembly according to the present invention will become more clearly appreciated from the following description taken in conjunction with the accompanying drawings, in which.

DESCRIPTION OF THE PREFERRED EMBODIMENT

Figure 1:
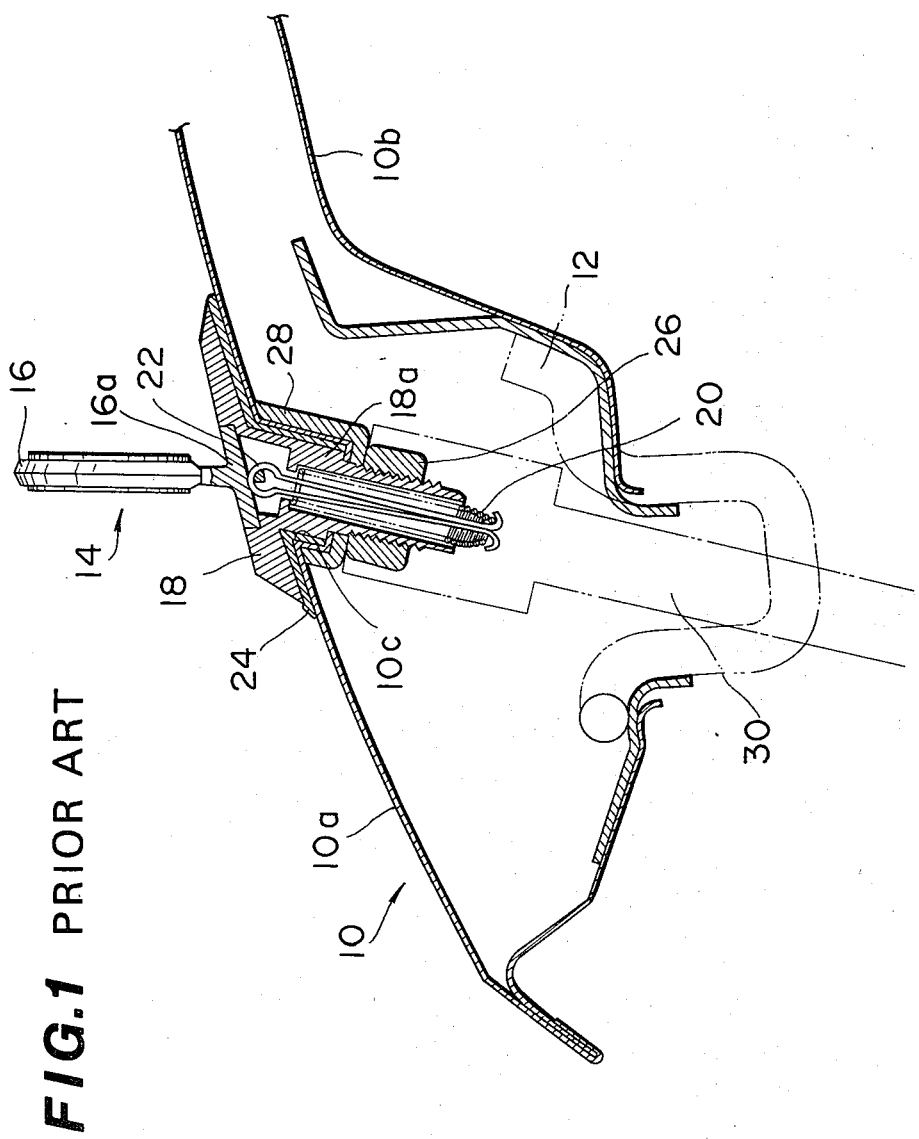
FIG. 1 is a sectional view of a prior art tiltable ornament and its mounting.
Figure 2:
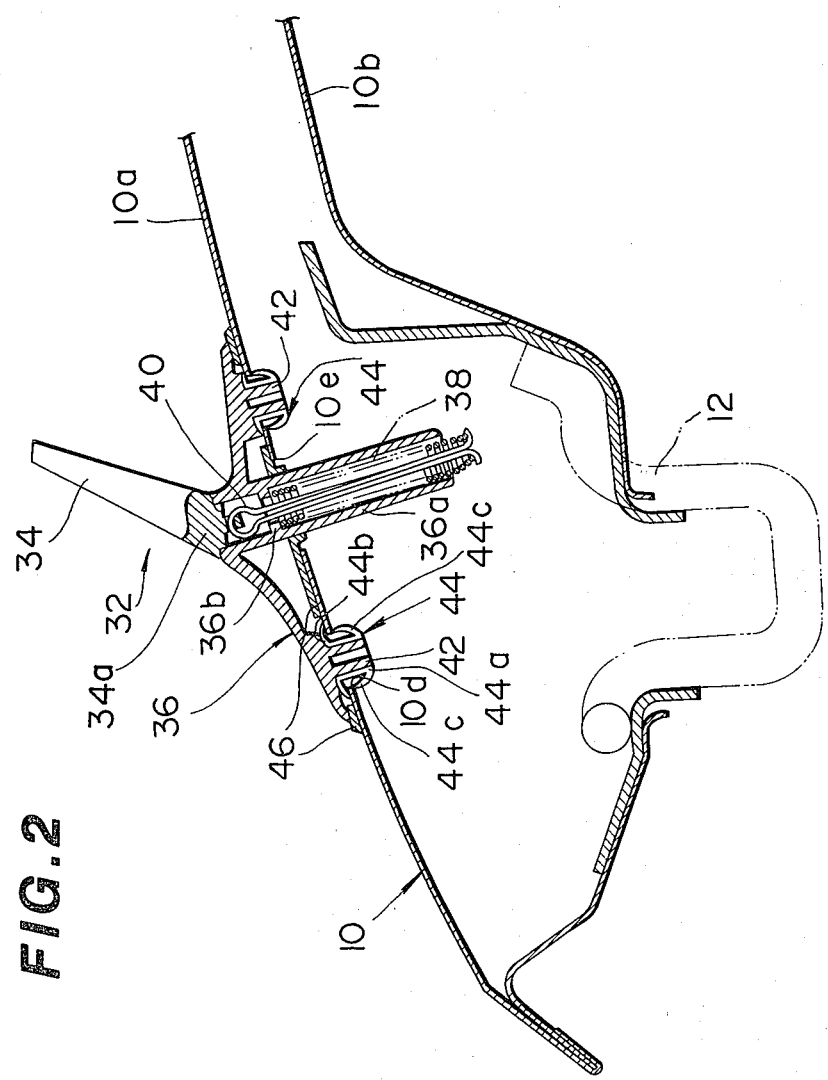
FIG. 2 is a sectional view of a tiltable ornament and its mounting embodying the present invention.
Figure 3:
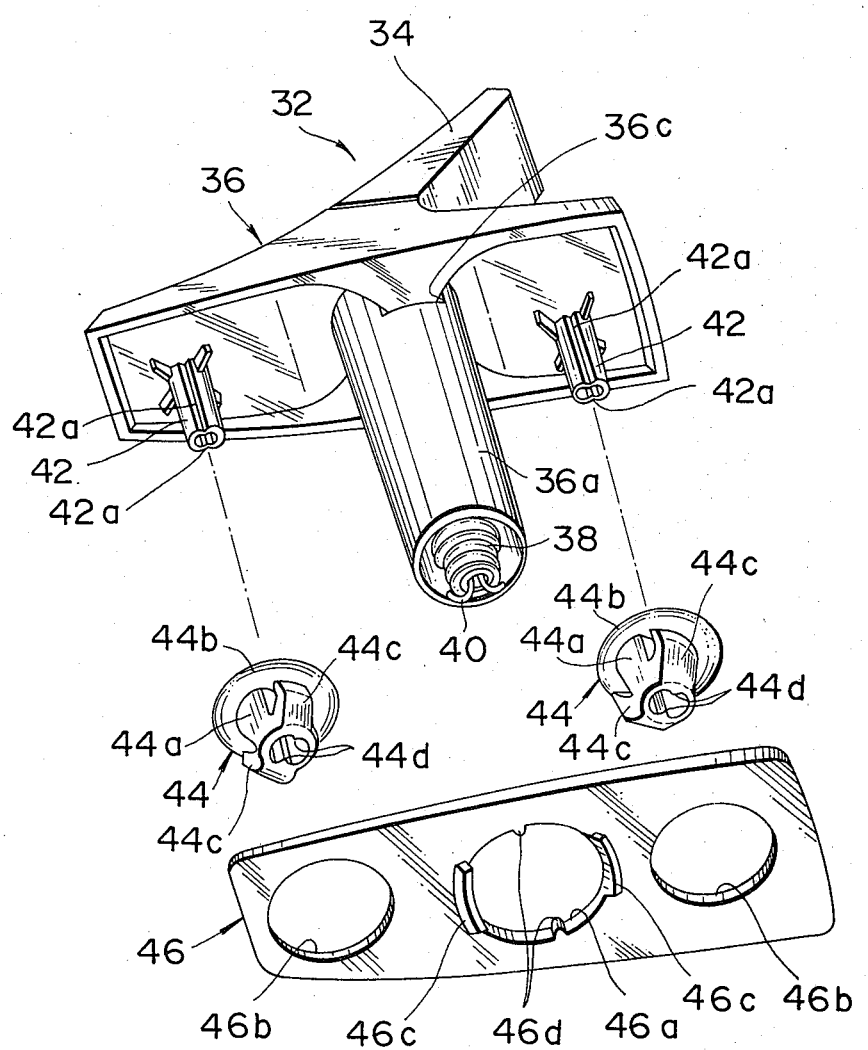
FIG. 3 is an exploded, perspective view of the tiltable ornament assembly of FIG. 2.

Referring to FIGS. 2 and 3, in which like parts to those of the prior art structure of FIG. 1 are designated by like reference characters and explanation thereto will be omitted for brevity, a tiltable ornament assembly according to an embodiment of the present invention is generally designated at 32 and shown to comprise an ornament 34 and a base 36. In this embodiment, the ornament 34 and the base 36 are both made of aluminium by die casting. The base 36 is provided with a sleeve-like downward extension 36a receiving therein a coil spring 38. The sleeve-like extension 36a has a reduced bore portion defining an annular shoulder 36b, and the upper end of the coil spring 38 is seated on the annular shoulder 36b whilst the lower end projects downwardly from the sleeve-like extension 36a to be seated on a bent or hooked lower end of a split pin 40. The split pin 40 passes through the coil spring 38 toward its upper end where it is hooked or anchored to the pedestal portion 34a of the ornament 34. The pedestal portion 34a is provided with a sole which is fittingly received in the correspondingly shaped seating of the base 36. In the above manner, the coil spring 38 is installed in a compressed state. By the foregoing, the ornament 34 is rockably and displaceably mounted on the base 36. That is, the ornament 34 is free to move in any direction relative to the base in the event of an impact and may, after displacement, either return to its proper position or be held fast resiliently in its changed position. For example, in the event of an impact from the front, the ornament 34 is displaced from the normal position shown in FIG. 2 and can rock rearwardly so as to become inclined whereby injury to a part of a person or object striking the ornament is prevented.

The above structure substantially follows the conventional fashion except that the sleeve-like extension 36a of the base 36 is adapted to be arranged substantially perpendicular to the outer hood panel 10a. In accordance with the present invention, the base 36 is further provided with a pair of integral anchor posts in the form of downward projections 42 which are respectively arranged on the opposite sides of the sleeve-like extension 36a referred to the longitudinal or front-to-rear direction of the vehicle. The anchor posts 42 are substantially cylindrical and hollow but slightly taper toward their lower free ends and are formed on the outer cylindrical faces thereof with V-shaped depression or grooves 42a extending longitudinally throughout the length thereof. That is, each anchor post 42 has two diametrically opposed V-shaped depressions 42a as seen from FIG. 3. To the anchor posts 42, a pair of clips or attaching members 44 are force-fitted. Each clip 44 is made of a synthetic resinous material and in the form of having a tubular body 44a, an annular flange 44b extending outwardly from the upper end of the tubular body 44a and curved slightly downward as it extends outward from the upper end, and a pair of detents or pawls 44c extending outwardly and upward from the lower end of the tubular body 44a and curved slightly upward as they extend outward from the lower end. The tubular body 44a has a cylindrical opening substantially corresponding in diameter to the projections 42 and is formed at the inner cylindrical face thereof with a pair of diametrically opposed V-shaped teeth 44d. Each V-shaped tooth 44d has a corss section slightly larger than that of the V-shaped depression 42a and is received in the same when the clips 44 is fitted on the projections 42. The above described pawls 44c are arranged diametrically opposed and located adjacent the V-shaped teeth 44d, respectively. Due to the V-shaped depressions and teeth, the relative rotation between the clip 44 and the projection 42 can be prevented. With the provision of the clips 44, the base 36 is secured to the outer hood panel 10a by means of the clips 44 which are adapted to grip the outer hood panel 10a by interposing the outer hood panel 10a between the annular flanges 44b and the pawls 44c when inserted into the corresponding openings 10d.

Between the base 36 and the outer hood panel 10a, there is interposed a resilient base pad 46 made of a synthetic resinous material for preventing the aluminium die-cast base 36 from directly contacting the paint-coated hood panel. The base pad 36 is formed with a base extension accommodating hole 46a for allowing the sleeve-like extension 36a of the base 36 to pass therethrough and a pair of clip accommodating holes 46b for allowing the clips 44 to pass therethrough. Along the edge defining the base extension accommodating hole 46a, the base pad 46 is also provided with a pair of part cylindrical, downward flanges 46c for preventing the sleeve-like extension 36a of the base 36 from contacting the outer hood panel 10a surrounding the extension 36a. The base pad 46 is further provided with a pair of fingers 46d on the wall defining the base extension accommodating hole 46a for engagement with the corresponding depressions 36c formed on the outer cylindrical wall of the sleeve-like extension 36a of the base 36. By the interengagement of the fingers 46d and the depressions 36c, the base 36 and the base pad 46 are located relative to each other and assembled temporarily.

In the foregoing, it is to be understood that the clip accommodating hole 46b is formed a little larger than the largest diameter portion of the clip 44, whilst the projecting amount of the flange 46 is determined sufficient larger than the thickness of the outer hood panel 10a.

The installation of the above described ornament assembly according to the present invention is made as follows.

First, the clips 44 are force-fitted to the respective anchor posts 42 of the base 36 preassembled with the ornament 34 by means of the spring 38 and the split pin 40. The base pad 46 is then attached to the base 36 by letting the clips 44 to project from the clip accommodation holes 46b and also bringing the fingers 46d into engagement with the depression 36c. The base pad 46 is thus assembled temporarily with the base 36 and prevented from being stripped off the same.

The base 36 is placed together with the base pad 46 on the outer hood panel 10a by a mechanic working from the outside of the hood 10 by letting the clips 44 to be inserted into the corresponding openings 10d and also the sleeve-like extension 36a into the corresponding opening 10e. In this instance, upon the insertion of the clips 44 into the respective openings 10d, each clip is resiliently deformed allowing the pawls 44c to be folded or become narrower to pass the openings 10d and, after passage, returns to its original shape allowing the pawls to spread outward and engage the inner face of the outer hood panel 10a, with the flange 44b, on the other hand, engaging the outer face of the outer hood panel. By the effect of the stiffly resilient flange 44b deformed to urge the pawls 44c against the inner face of the outer hood panel 10a, the clips 44 are adapted to firmly grip the outer hood panel 10a by interposing the outer hood panel between the flanges 44b and the pawls 44c. The base 36 and therefore the ornament assembly 32 is thus mounted on the hood 10 by a mechanic working entirely from the outside of the car.

In the foregoing, it is to be understood that the aluminium die-cast base 36 is prevented from contacting at any part thereof with the outer hood panel 10a whereby damage and rusting thereof can be prevented.

It is further to be understood that not only the ornament assembly but also the hood can enjoy the more flexible design according to the present invention since the ornament can now be installed by mounting means which does not require a mechanic to reach into the inside of the car or work from the other side of the member on which he is mounting the ornament. For example, the restrictions otherwise existing in determining the location of the ornament on the hood are considerably reduced.

It is further to be understood that the ornament assembly of the present invention enables to attain reduction in both the manufacturing and assembling costs since not only the assembling work of the ornament becomes simpler and easier but also the number of the constituent parts of the ornament assembly is reduced.

Obviously, many variations and modifications of the present invention are possible in light of the above teachings. It is, therefore, to be understood that within the scope of the appended claims, the invention may be practiced otherwise than as specifically described.

What is claimed is:

1. A tiltable ornament assembly for mounting on a vehicle body comprising:
   a base adapted to be supported on a panel of the vehicle body;
   an ornament adapted to be supported on said base;
   resilient means for yieldingly retaining said ornament in position on said base;
   said base being provided with a sleeve-like extension protruding inwardly of the vehicle body through a first opening in said panel and receiving therein said resilient means;
   said base being further provided with two anchor posts protruding inwardly of the vehicle body through second openings in said panel;
   a base pad interposed between said base and said panel; and
   two clips attached to said respective anchor posts and adapted to resiliently deform for insertion into said openings and then expand to grip said panel at a location around said second openings for thereby securing said base to said panel.

2. A tiltable ornament assembly as set forth in claim 1, in which said base and said ornament are made of metal by die casting and in which said base is integrally formed with said sleeve-like extension and said anchor posts.

3. A tiltable ornament assembly as set forth in claim 1, in which said anchor posts are respectively arranged on the opposite sides of said sleeve-like extension referred to the longitudinal direction of the vehicle body.

4. A tiltable ornament assembly as set forth in claim 1, in which each of said clips is in the form of having a tubular body force-fitted to each of said anchor posts, an annular flange extending outwardly from one end of said tubular body and slightly curved toward the other end of said tubular body as it extends outwardly from said one end, and a pair of pawls extending from said other end of said tubular body outwardly and toward said one end and slightly curved toward said one end as they extend outwardly from said other end, said annular flange being brought into contact with the outer face of said panel whilst said pawls being brought into contact with the inner face of said panel, said pawls being adapted to become narrower to pass said second openings and, after passage, spread outwardly to cooperate with said annular flange to firmly grip said panel.

5. A tiltable ornament assembly as set forth in claim 4, in which each of sid anchor posts is substantially cylindrical and formed on the cylindrical face with two diametrically opposed V-shaped depressions extending longitudinally throughout the length thereof, and in which said tubular body of each of said clips has a substantially cylindrical inner face formed with two diametrically opposed V-shaped teeth engaging said depressions.

6. A tiltable ornament assembly as set forth in claim 5, in which each of said V-shaped tooth has a cross section slightly larger than that of said V-shaped depression.

7. A tiltable ornament assembly as set forth in claim 1, in which said base pad has a hole through which said sleeve-like extension of said base passes, said base pad also having a pair of part cylindrical flanges extending along the edge of said hole and received in said first opening to prevent said sleeve-like extension from contacting said panel surrounding said extension.

8. A tiltable ornament assembly as set forth in claim 7, in which said base pad is further provided with a pair of fingers on the wall defining said extension accommodating hole, and in which said sleeve-like extension of said base is provided with a pair of depressions brought into engagement with said fingers such that said base and said base pad are located relative to each other.

* * * * *